Figure 1:
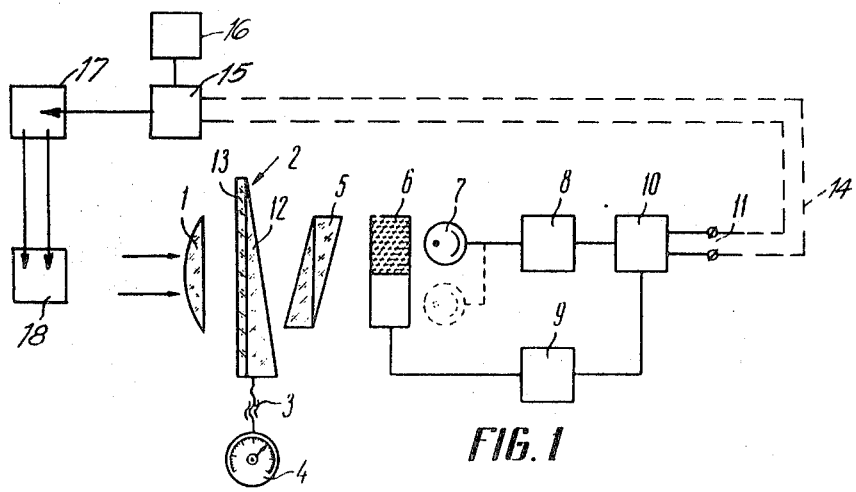

United States Patent

[11] 3,608,817

| | | |
|---|---|---|
| [72] | Inventor | Dary Yakovlevich Svet<br>ulitsa Fersmana 3, kv. 17, Moscow,<br>U.S.S.R. |
| [21] | Appl. No. | 782,227 |
| [22] | Filed | Dec. 9, 1968 |
| [45] | Patented | Sept. 28, 1971 |

[54] METHOD OF CONTROLLING COLOR OF AN OBJECT BY ITS RADIATION AND DEVICE FOR ACCOMPLISHING THE SAME
3 Claims, 3 Drawing Figs.

[52] U.S. Cl. .................................................. 236/78, 73/355
[51] Int. Cl. ........................................... G05d 23/27
[50] Field of Search .................................. 236/15, 18 D; 73/355; 219/502; 250/212

[56] References Cited
UNITED STATES PATENTS

| | | | | |
|---|---|---|---|---|
| 3,222,930 | 12/1965 | Smith | | 73/355 |
| 3,454,769 | 7/1969 | Dynes | | 73/355 X |
| 3,457,412 | 7/1969 | Cary | | 73/355 X |

*Primary Examiner*—William E. Wayner
*Attorney*—Waters, Roditi, Schwartz & Nissen ABSTRACT: A method for controlling color temperature of an object by its radiation from which at least two radiation fluxes of different spectral compositions are separated and thereafter transformed in a device including a flux ratio setter disposed in front of or ahead of a radiation receiver, a modulator and a limiting amplifier, the transformation of the fluxes or corresponding signals being effected so as to equalize them when the object under examination acquires a temperature to be maintained constant, while temperature deviation from the preset value results in an unbalance signal which is fed to a heater of the object in order to nullify the unbalance of the aforesaid radiation fluxes.

METHOD OF CONTROLLING COLOR OF AN OBJECT BY ITS RADIATION AND DEVICE FOR ACCOMPLISHING THE SAME

This invention relates to methods and means for controlling the temperature of an object by its radiation and, more particularly, to methods and means for controlling the color temperature whose value is governed by the ratio of radiation fluxes.

It is known to control the temperature of an object by means of automatic color pyrometers comprising a modulator, radiation receivers, and an output phase stage (cf. "Temperature and its Measurement and Control," Wiley and Sons, N.Y., L., 1962).

The prior art systems of color pyrometers suffer from a number of disadvantages such as an excessively elaborate design and significant operational error; a substantial portion of the overall instrumental or operational error being due to the signal ratio circuit error and also to the output recorder error. Another disadvantage of the known color pyrometers is the slow response time of the circuit.

Accordingly, it is an object of the present invention to provide a method and a device affording high-accuracy control of the color temperature wherein the device exhibits high sensitivity to temperature variations.

It is another object of the present invention to provide a device for controlling the color temperature and which is characterized by its high performance reliability and design simplicity.

It is a further object of the present invention to provide a device for controlling the color temperature and which is characterized by quick-response time characteristics.

These and other objects are accomplished by the provision off a method according to which radiation fluxes of different spectral compositions emitted by a test object or sample or corresponding signals are transformed so as to equalize the fluxes of the signals once the test object acquires the temperature that is to be maintained constant, while temperature deviation from the preset value results in an unbalance signal, which signal is fed to means for heating the test object in order to nullify the aforesaid flux or signal unbalance.

The device for controlling the color temperature of the test object comprises, according to the invention, a selective optical absorber disposed ahead or upstream of a receiver and intended for setting the requisite ratio of radiation fluxes emitted by the test object; a modulator consisting of an element which provides for a low pulse duty ratio at the output thereof, and a limiting amplifier disposed between a radiation receiver and an output phase stage.

In another embodiment of the device, according to the invention, in which use is made of a single radiation receiver and of a modulator (shutter) having light filters in the radiation transmission zones, a set point adjuster (setter) is provided including an optical element consisting of a color wedge giving a Z-shaped spectral transmittance vs. wave length curve and a nonselective absorber rigidly linked to the wedge, the absorber exhibiting a variable transmittance.

Figure 2:
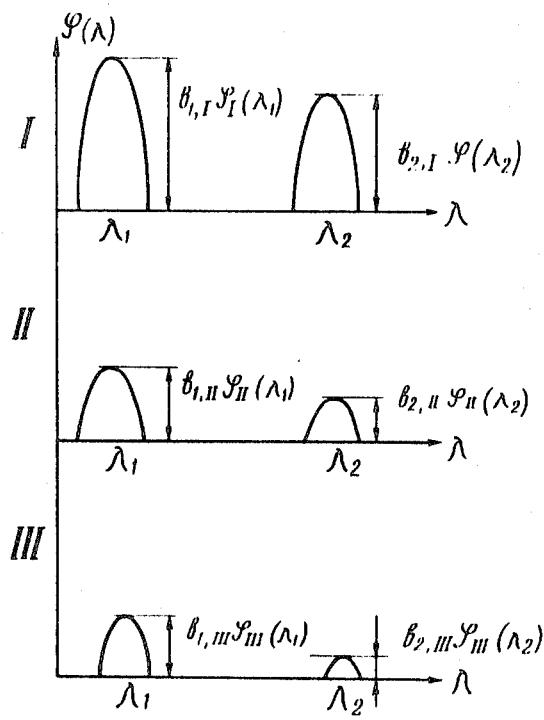
Figure 3:
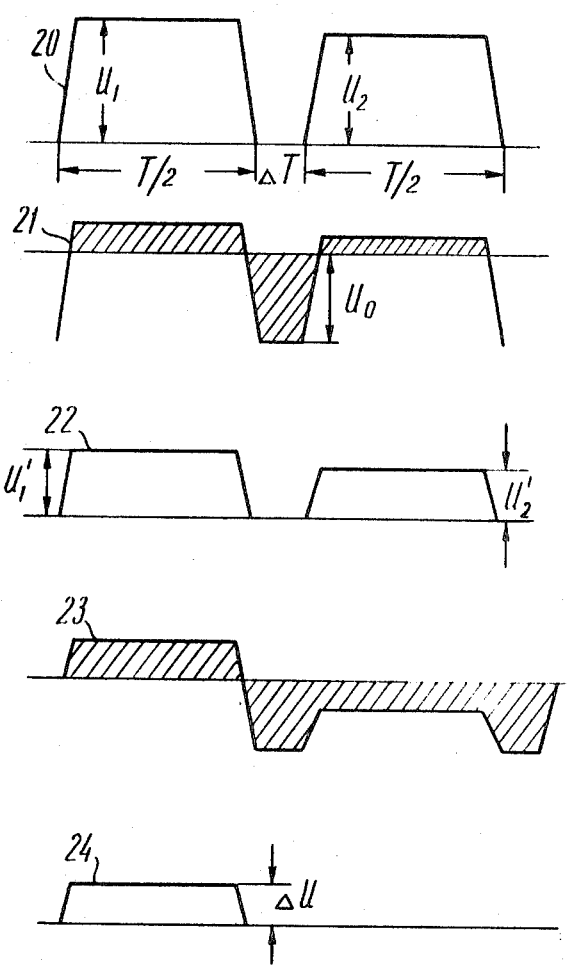

The present invention is illustrated hereinbelow by the description of an exemplary embodiment thereof with reference to the accompanying drawings, wherein:

FIG. 1 is a simplified diagram of the color temperature control device, according to the invention;

FIG. 2 presents graphs of ratios of radiation fluxes with spectral radiances $b_{1i}$ and $b_{2i}$ for three positions of a setter of the device of FIG. 1, and FIG. 3 shows graphs of pulses at the output of various elements of the device of FIG. 1.

The device for controlling the color temperature of a test object by its radiation comprises in series the following components: an optical input element 1 (FIG. 1), which receives the radiant flux from the test object; an optical setter 2, which adjusts the ratio of radiation fluxes depending upon the color temperature whose constancy is to be maintained, the setting being effected by means of a mechanism or means 3 furnished with a scale 4; a monochromator 5, which separates the radiation fluxes having the requisite spectral composition from the total flux; a radiation flux modulator 6; a radiation receiver 7 with transducers (photo or thermoelectric or bolometer transducers) for converting the radiation fluxes of the appropriate spectral composition into electric signals; a limiting amplifier 8; a reference voltage source 9 for feeding modulator 6, and an output phase stage 10 with control signal output terminals 11. These signals are directed by a line 14 to an actuating means 15 which controls the power supplied from a power source 16 to a heater 17 of a test object 18.

The principle on which the present device operates can be elucidated as follows.

Let us denote the radiance (luminance) for two spectral regions selected by monochromator 5 and having the effective wave lengths $\lambda_1$ and $\lambda_2$ as $\Phi_{1,i}\beta_1$ and $\Phi_{2,i}\beta_2$, wherein $\Phi_{1,i}$ and $\Phi_{2,i}$ stand for respective transmittances of setter 2 for a given temperature $T_i$.

Let us next denote the signals at the output of receiver 7 corresponding to the aforesaid values of the radiance as $U_1 = \Phi_{1,i}\gamma_1 \cdot b_1$ and $U_2 = \Phi_{2,i}\gamma_2 \cdot b_2$, wherein $\gamma_1$ and $\gamma_2$ stand for factors which depend upon the transmission characteristics of monochromator 5 and also upon the special sensitivity of receiver 7. Setter 2 adjusts the temperature, $T_i$, which should be maintained constant, for the spectral regions of $\lambda_1$ and $\lambda_2$, respectively, wherein $\lambda_1 < \lambda_2$.

Let us denote the transmission factors of limiting amplifier 8 as $K_1$ and $K_2$ and the voltages at the amplifier output as $U'_1$ and $U'_2$, so that $U'_1 = K_1 \cdot U_1$ and $U'_2 = K_2 \cdot U_2$.

Where the test object temperature $T_x$ equals the preset temperature, i.e. $T_x = T_i$, then $U_1 = U_2$ and $U'_1 = U'_2$ and, consequently, $K_1 = K_2$, the voltage at output terminals 11 being $\Delta U = U_{1a}' - U_2' = 0$.

Since $\gamma_1$ and $\gamma_2$ are constants, their ratio $\gamma_1/\gamma_2 = $ Const. Then $\Phi_{1,i}/\Phi = $ Const. $b_{2,i}/b_{1,i}$, but, on the other hand, $b_{2,i}/b_{1,i} = f(^2T'_{c,i})$ wherein $T_{c,i}$ is the color temperature determined from the spectral ratio $b_{2,i}/b_{1,i}$.

Hence, $\Phi_{1,i}/\Phi_{2,i} = f(T_{c,i})$, so that each $i$-th position of setter 2 corresponds to the $i$-th value of the color the color temperature.

Where the temperature of the test object exceeds the preset value, i.e. $T_x > T_i$ then $b_{2,x}/b_{1,x} < b_{2,i}b_{2,i}$ and the voltage $\Delta U > 0$. Conversely, if the temperature of the test object is below the present value, i.e. $T_x <$ then $b_{2,x}/b_{1,x} > b_{2,i}/b_{1,i}$ and the voltage $\Delta U < 0$.

The voltage $\Delta U$ serves the useful purpose of controlling the heater of the test object in order to bring the temperature of the object to the desired value.

Setter 2, which is designed for adjusting a specific temperature to be maintained thereafter, comprises an optical element consisting of a selective absorber (color wedge) 12, which is characterized by a Z-shaped spectral transmittance vs. wavelength curve, and a nonselective absorber 13 rigidly linked or connected to the wedge, said nonselective absorber exhibiting a variable transmittance.

The farther from the wedge apex a radiant flux traverses color wedge 12, the greater the variation of the ratio of transmitted fluxes having spectral radiances $b_1$ and $b_2$, so that for three settings I, II and III (Fig. 2) of the flux relative to setter 2 the following inequality will hold: $(b_1/b_2)_I < (b_1/b_2)_{II} < (b_1/b_2)_{III}$. However, since $\lambda_1 < \lambda_2$, higher ratios $1/b_2$ would correspond to greater values of the color temperature, $T_{c,i}$, while temperature growth results, in accordance with the Wien-Planck law, in an extremely rapid increase of the absolute magnitude of spectral radiances $b_1$ and $b_2$, viz, approximately to the 5 the power.

This situation, in turn, brings about a marked increase of the requisite dynamic range of the receiver and electric circuit operation and affects adversely the accuracy of control.

Graphs I, II and III in Fig. 2 illustrate the relationship of the radiation fluxes having spectral radiances $b_{1,i}$ and $b_{2,i}$ for three settings I, II and III of setter 2 controlled either by an operator or a programmer for the setter 2, the settings corresponding to three values of the preset controlled temperature, $T_I$, $T_{II}$ and $T_{III}$, wherein $T_I < T_{II} < T_{III}$.

The aforesaid design of the set point adjuster (setter) provides for practically precision setting of the controlled temperature, the accuracy being of the order of $10^{13}$ to $10^{14}$ in a broad temperature range.

High sensitivity and accurate functioning of the present device are attained in a relatively simple manner due to a marked performance stability of setter 2, as well as to a low pulse duty ratio obtained at the output of modulator 6 and radiation receiver 7. The performance of modulator 6 and limiting amplifier 8 is illustrated by voltage curves in Fig. 3. In this instance, modulator 6 is made in the form of a shutter having apertures (L) which pass the radiation flux and nontransmitting areas ($b$) disposed between the apertures.

The pulse duty ratio, D, can be expressed as $D=l/l$. It is, therefore, obvious that the smaller the magnitude of D as compared to unity, the more effective the process of amplitude restriction as to minimum and the greater the sensitivity of the device, as evidenced by a consideration of the curves of Fig. 3 wherein:

represents voltage pulses at the output of radiation flux receiver;
21 denotes voltage pulses at the input of limiting amplifier 8 ($U_o$ is the restriction level as to minimum);
22 shows pulse voltages after restriction as to minimum;
23 is the variable component at the input of phase stage 10;
24 represents for voltage pulses at the output of phase stage 10 when $U_2>U_1$.

The above description illustrates an embodiment of the present invention and is not intended to be construed in a limiting sense.

I claim:

1. A method of controlling color temperature of an object by its radiation comprising the steps of selecting at least two fluxes of different spectral compositions transforming said fluxes into electric signals proportional to the luminances of said fluxes, the ratio of said signals defining the color temperature of the object, reducing the flux having a higher intensity until said ratio is unity at which time the object will be at a constant desired temperature, continuously producing the difference between said signals and controlling the temperature of said object until the difference equals zero.

2. A device for controlling color temperature of an object by utilizing its radiation, comprising an object radiation receiver adapted for selecting at least two fluxes of different spectral composition and transforming said fluxes into output pulses; optical means concentrating radiation on said receiver; a monochromator supported between said optical means and said receiver; a modulator supported in the path of the radiation fluxes from the object in front of said receiver and adapted for periodically interrupting the radiation fluxes and maintaining a low pulse duty ratio; means comprising an optical element having a varying spectral transmittance on the surface thereof and disposed ahead of said receiver in the path of the flux for setting the required ratio between said selected radiation fluxes; a limiting amplifier connected to the output of the receiver to transform said pulses; a phase stage connected to the output of said limiting amplifier and means for supplying said phase stage with reference voltage synchronized with the operation of said modulator and monochromator.

3. A device as claimed in claim 2, wherein optical element with varying spectral transmittance on the surface thereof is a color wedge having a Z-shaped spectral transmittance vs. wavelength curve and a nonselective absorber rigidly connected with the color wedge, and including shifting means to vary the relative position of the center of the radiation flux with respect to said optional element.